(12) United States Patent
Nakamura et al.

(10) Patent No.: US 12,412,475 B2
(45) Date of Patent: Sep. 9, 2025

(54) CONTROL DEVICE, WARNING CONTROL METHOD, AND NON-TRANSITORY COMPUTER-READABLE STORAGE MEDIUM

(71) Applicant: Panasonic Intellectual Property Management Co., Ltd., Osaka (JP)

(72) Inventors: Tetsuo Nakamura, Kanagawa Ken (JP); Takayuki Suzuki, Kanagawa Ken (JP); Akitoshi Yamashita, Hyogo Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 140 days.

(21) Appl. No.: 18/242,986

(22) Filed: Sep. 6, 2023

(65) Prior Publication Data

US 2024/0013660 A1    Jan. 11, 2024

Related U.S. Application Data

(63) Continuation of application No. PCT/JP2021/047714, filed on Dec. 22, 2021.

(30) Foreign Application Priority Data

Mar. 26, 2021   (JP) .................... 2021-054330

(51) Int. Cl.
*B60Q 1/00*     (2006.01)
*G06T 7/60*    (2017.01)
(Continued)

(52) U.S. Cl.
CPC .............. *G08G 1/167* (2013.01); *G06T 7/60* (2013.01); *G06T 7/73* (2017.01); *G08G 1/04* (2013.01); *G06T 2207/30256* (2013.01)

(58) Field of Classification Search
CPC . G08G 1/167; G08G 1/04; G08G 1/16; G06T 7/60; G06T 7/73; G06T 2207/30256; G06V 20/58; G06V 20/588; H04N 7/18
See application file for complete search history.

(56) References Cited

U.S. PATENT DOCUMENTS 5,555,312 A * 9/1996 Shima ................. G05D 1/0246
                                                                  382/104
5,699,057 A * 12/1997 Ikeda ..................... G01S 11/12
                                                                  382/104

(Continued)

FOREIGN PATENT DOCUMENTS

JP    2015-225546    12/2015
WO    2017/082370    5/2017

OTHER PUBLICATIONS

International Search Report (ISR) from International Searching Authority (Japan Patent Office) in International Pat. Appl. No. PCT/JP2021/047714, dated Feb. 15, 2022, together with an English language translation.

*Primary Examiner* — Toan N Pham
(74) *Attorney, Agent, or Firm* — Greenblum and Bernstein, P.L.C.

(57) ABSTRACT

A control device according to the present disclosure is a control device for emitting a warning about other vehicle approaching an own vehicle, and includes a memory configured to store a program and a processor coupled to the memory and configured to execute the program to perform processing. The processing includes: detecting a position of a lane boundary line indicating a boundary in a width direction of a road on which the own vehicle travels based on a captured image captured by a camera configured to capture an image around the own vehicle; detecting a position of the other vehicle based on the captured image; and performing control to output a warning to a driver of the (Continued)

own vehicle based on a relationship between the position of the lane boundary line and the position of the other vehicle.

13 Claims, 12 Drawing Sheets

(51) Int. Cl.
*G06T 7/73* (2017.01)
*G08G 1/04* (2006.01)
*G08G 1/16* (2006.01)

(56) References Cited

U.S. PATENT DOCUMENTS

| | | | | |
|---|---|---|---|---|
| 5,786,772 | A * | 7/1998 | Schofield | B60R 21/01564 |
| | | | | 180/169 |
| 8,645,001 | B2 * | 2/2014 | Basson | B60Q 9/008 |
| | | | | 701/1 |
| 8,903,638 | B2 * | 12/2014 | Lin | B60Q 9/008 |
| | | | | 348/148 |
| 2013/0050491 | A1 | 2/2013 | Lin et al. | |
| 2018/0208201 | A1 | 7/2018 | Hui et al. | |
| 2018/0259636 | A1 | 9/2018 | Aoyagi et al. | |
| 2019/0035280 | A1 * | 1/2019 | Kim | G08G 1/167 |

* cited by examiner

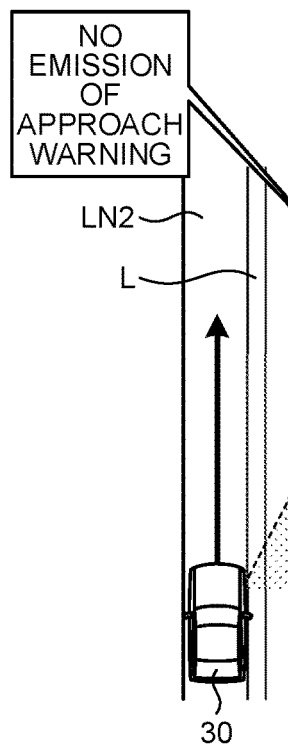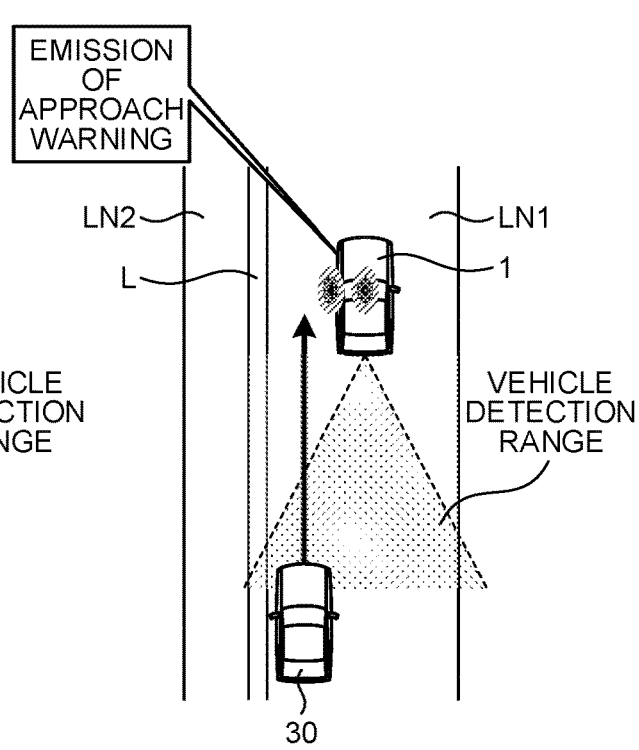

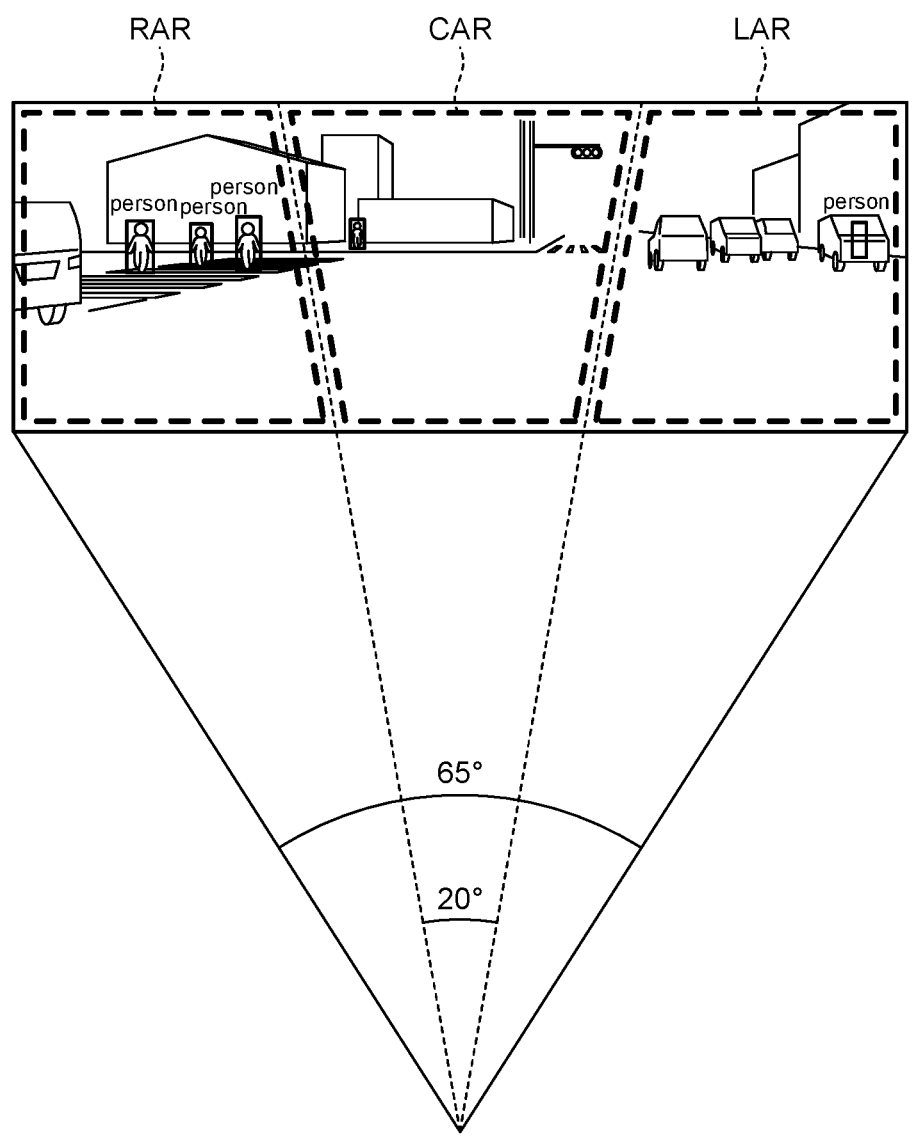

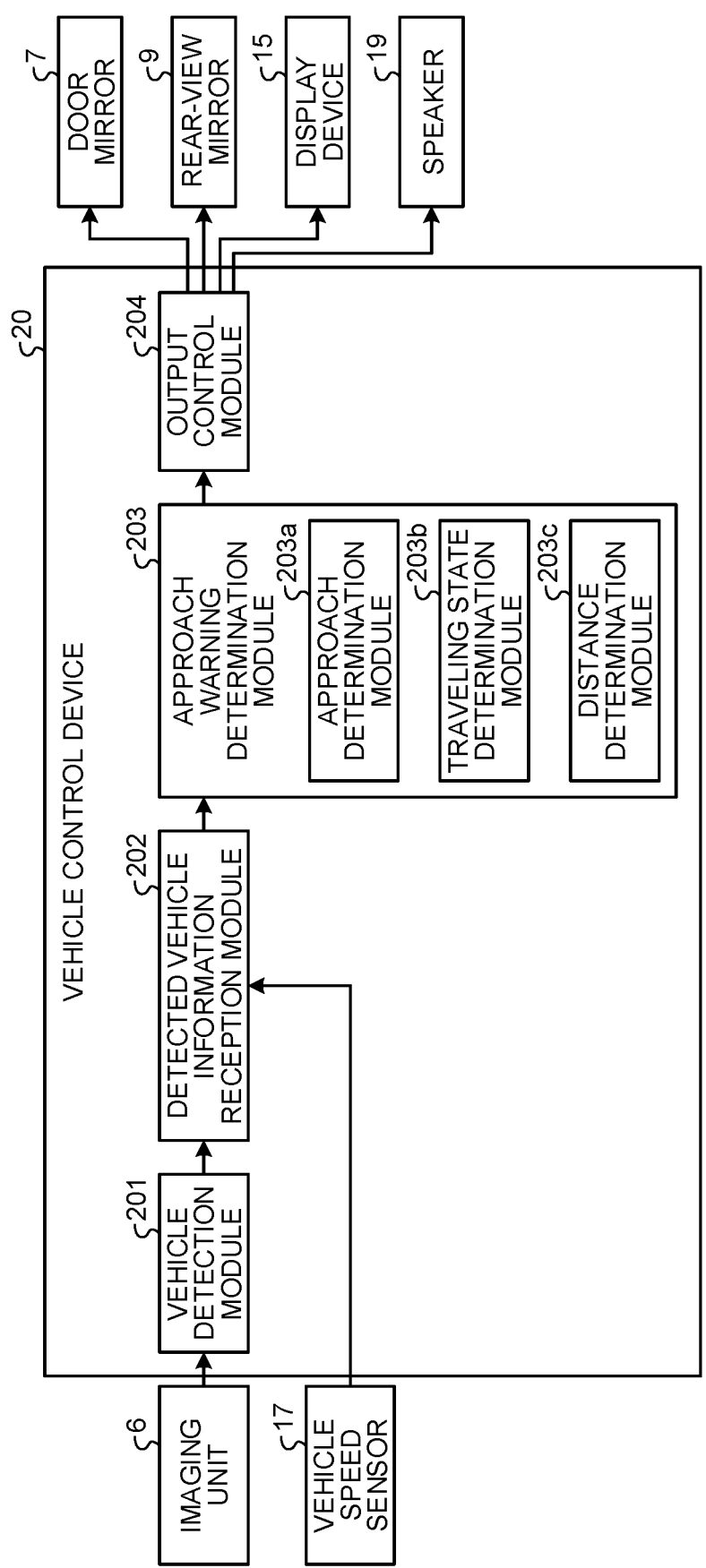

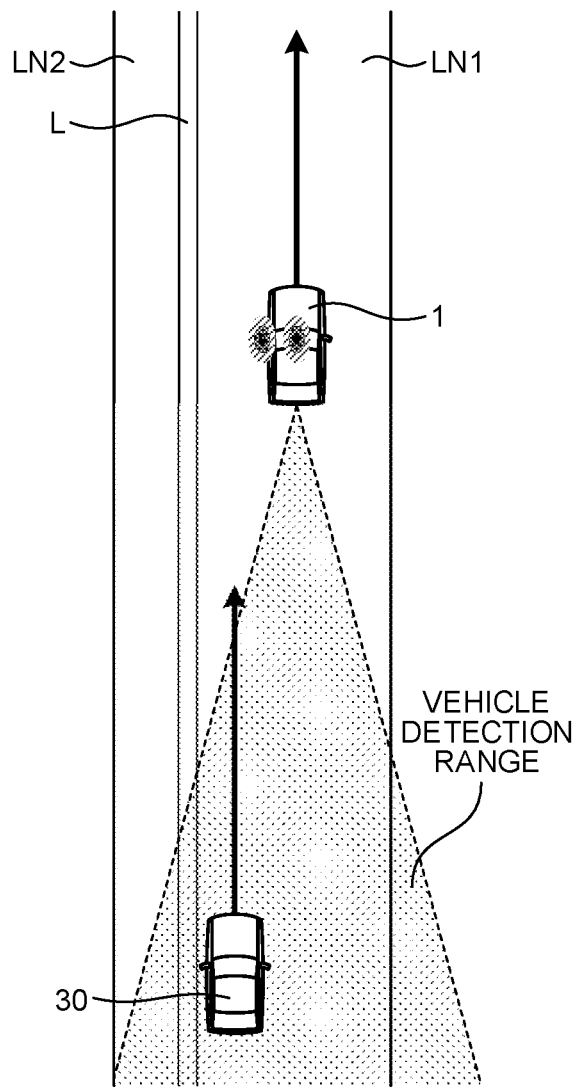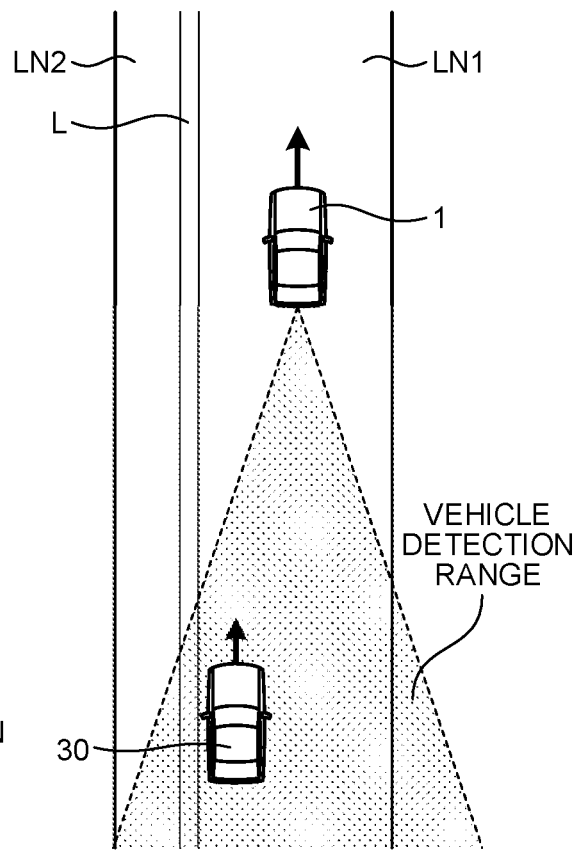

CONTROL DEVICE, WARNING CONTROL METHOD, AND NON-TRANSITORY COMPUTER-READABLE STORAGE MEDIUM

CROSS-REFERENCE TO RELATED APPLICATIONS

This application is a continuation of International Application No. PCT/JP2021/047714, filed on Dec. 22, 2021 which claims the benefit of priority of the prior Japanese Patent Application No. 2021-054330, filed on Mar. 26, 2021, the entire contents of which are incorporated herein by reference.

FIELD

Embodiments described herein relate generally to a control device, a warning control method, and a non-transitory computer-readable storage medium.

BACKGROUND

Functions of warning the approach of other vehicles are useful for accident prevention. For example, one function in practical use is an approach warning function of allowing a part of a side mirror to blink. One example of such a technique of emitting a warning is a disclosed technology of including: a radar having a first detection area for detecting an object traveling on the rear side of a vehicle and a second detection area having a width in the vehicle width direction smaller than that of the first detection area; a detector configured to detect a traveling state; and a controller configured to control the radar by switching between the first detection area and the second detection area according to the traveling state other than the traveling direction when the traveling direction of the traveling state is straight (for example, WO 2017/082370 A).

However, when the conventional technology has detected an approaching vehicle, a warning is always emitted even in a case where a danger is not particularly predicted. Therefore, the warning for the vehicle that has entered a detection range would be an ordinary event, leading to reduction in the driver's awareness of danger. In order to suppress this, it is conceivable to narrow the detection area by the radar. This can reduce the number of times of emitting the warning but would narrow the detection area. In addition, since the detection means is a radar, it is difficult to establish a complicated detection logic. The factors above can lead to a problem of reduction of hazard prediction accuracy.

SUMMARY

A control device according to the present disclosure includes a memory configured to store a program and a processor coupled to the memory and configured to execute the program to perform processing. The processing includes: detecting a position of a lane boundary line indicating a boundary in a width direction of a road on which an own vehicle travels, based on a captured image captured by a camera configured to capture an image around the own vehicle; detecting a position of other vehicle based on the captured image; and performing control to output a warning to a driver of the own vehicle based on a relationship between the position of the lane boundary line and the position of the other vehicle.

Moreover, a warning control method according to the present disclosure includes: detecting a position of a lane boundary line indicating a boundary in a width direction of a road on which an own vehicle travels, based on a captured image captured by a camera configured to capture an image around the own vehicle; detecting a position of other vehicle based on the captured image; and performing control to output a warning to a driver of the own vehicle based on a relationship between the position of the lane boundary line and the position of the other vehicle.

Moreover, a non-transitory computer-readable storage medium according to the present disclosure stores a program to execute processing executable by a processor. The program causes a processor to execute: detecting a position of a lane boundary line indicating a boundary in a width direction of a road on which an own vehicle travels, based on a captured image captured by a camera configured to capture an image around the own vehicle; detecting a position of other vehicle based on the captured image; and performing control to output a warning to a driver of the own vehicle based on a relationship between the position of the lane boundary line and the position of the other vehicle.

BRIEF DESCRIPTION OF DRAWINGS

FIGS. 2(a)-2(b) are diagrams illustrating an outline of a warning operation in the vehicle according to the embodiment;

FIG. 3 is a diagram illustrating a problem that can occur with a narrow vehicle detection range;

FIG. 6 is a diagram illustrating an example of a configuration of functional blocks of the vehicle control device according to the embodiment;

FIGS. 10(a)-10(b) are diagrams illustrating an operation of changing a timing of emitting a warning in accordance with an absolute speed of the other vehicle in the vehicle according to the embodiment;

DETAILED DESCRIPTION

Hereinafter, embodiments of a control device, a warning control method, and a non-transitory computer-readable storage medium according to the present disclosure will be described with reference to the drawings.

Overall Configuration of Vehicle

Figure 1:
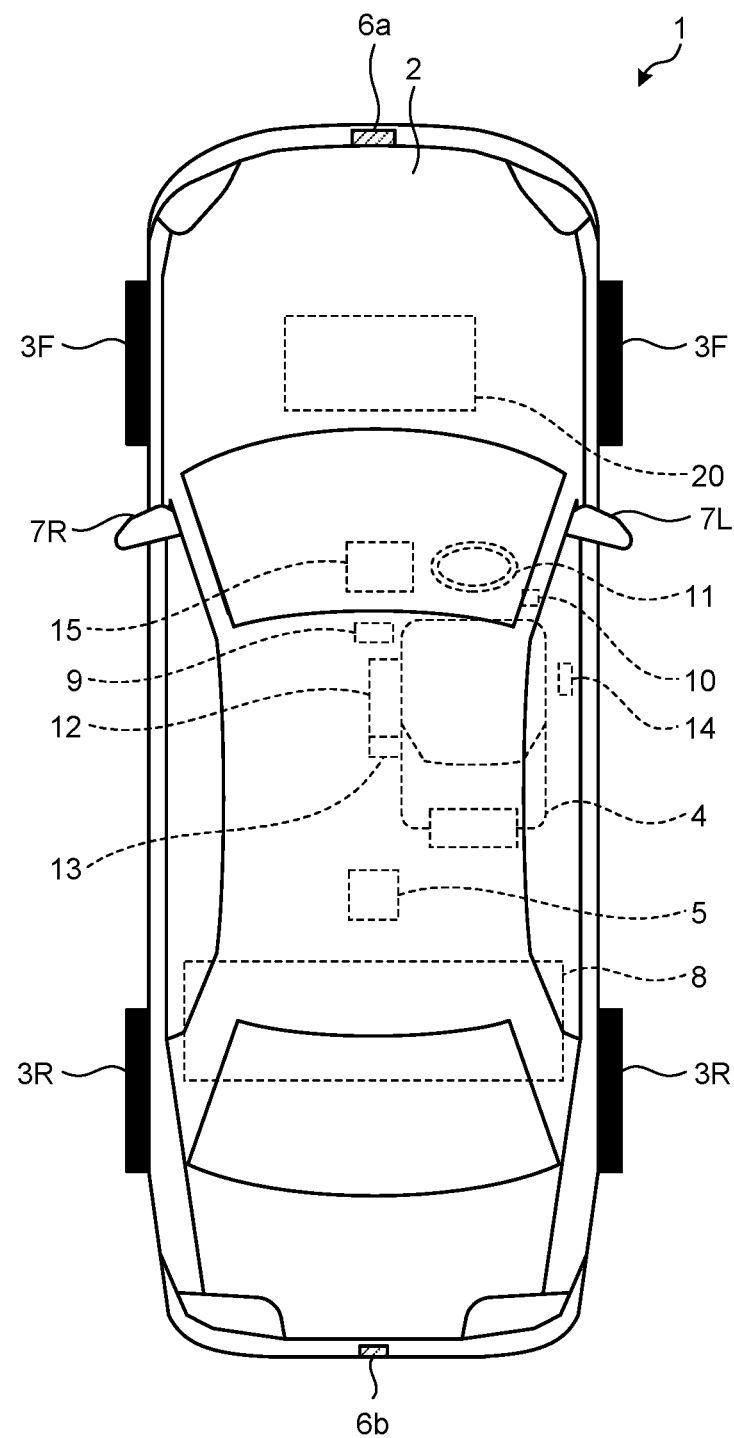
FIG. 1 is a diagram illustrating an example of an overall configuration of a vehicle according to an embodiment.

FIG. 1 is a diagram illustrating an example of an overall configuration of a vehicle according to the embodiment. An overall configuration of a vehicle 1 according to the present embodiment will be described with reference to FIG. 1.

As illustrated in FIG. 1, the vehicle 1 includes a vehicle body 2, wheels 3F, and wheels 3R. The wheels 3F are a pair of front wheels installed on the front side of the vehicle body 2 and in contact with the road surface. The wheels 3R are a pair of rear wheels installed on the rear side of the vehicle body 2 and in contact with the road surface. The vehicle 1 can travel using the pair of wheels 3F and the pair of wheels 3R disposed in a predetermined direction. In this case, the predetermined direction in which the wheel 3F and the wheel 3R are disposed is to be a moving direction of the vehicle 1, in which the vehicle 1 can move forward or backward by switching gears or the like. When any wheel out of the wheel 3F and the wheel 3R is denoted or when the wheels are collectively denoted, the wheel is simply referred to as a "wheel 3".

As illustrated in FIG. 1, the vehicle 1 includes a seat 4, a vehicle drive unit 5, an imaging unit 6a, an imaging unit 6b, a door mirror 7L, a door mirror 7R, a rear seat 8, a rear-view mirror 9, an engine switch 10, a steering wheel 11, a gear shift lever 12, a parking brake 13, a door lock device 14, a display device 15, and a vehicle control device 20.

The seat 4 is provided in a room of the vehicle 1 and is to be a driver's seat on which a driver of the vehicle 1 sits. The driver can manipulate the vehicle 1 by operating the steering wheel 11 or operating an accelerator pedal and a brake pedal (not illustrated) in a state of being seated on the seat 4.

The vehicle drive unit 5 is a drive device mounted on the vehicle 1. Examples of the vehicle drive unit 5 include an engine, a motor, and a driving portion of the wheel 3.

The imaging unit 6a is a camera that is provided in a front portion of the vehicle 1 to image the front of the vehicle 1. The imaging unit 6b is a camera that is provided in a rear portion of the vehicle 1 to image the rear of the vehicle 1. As will be described below, the imaging unit 6a and the imaging unit 6b are supposed to be monocular cameras or stereo cameras capable of detecting the position, distance, speed, and the like of another vehicle. When any imaging unit out of the imaging unit 6a and the imaging unit 6b is denoted or when the imaging units are collectively denoted, the imaging unit is simply referred to as an "imaging unit 6". The imaging unit 6a and imaging unit 6b may be provided on the door mirror 7L and the door mirror 7R. This makes it possible to output a warning to an approaching vehicle in the lateral direction not included as a detection target of the front camera and the rear camera.

The door mirror 7L is an exterior rear-view mirror attached to the front side of the left side door of the vehicle body 2 to visually recognize the left rear side. The door mirror 7R is an exterior rear-view mirror attached to the front side of the right side door of the vehicle body 2 to visually recognize the right rear side. The door mirror 7L and the door mirror 7R internally includes indicator lamps for warning approach of other vehicles. When any door mirror out of the door mirror 7L and the door mirror 7R is denoted or when the door mirrors are collectively denoted, the door mirror is simply referred to as a "door mirror 7". The door mirror may also be referred to as a side mirror or the like. In addition, instead of the door mirror 7, it is also allowable to install a fender mirror attached to the front end of the hood of the vehicle body 2.

The rear seat 8 is provided on the rear side of the vehicle interior of the vehicle 1 and is a seat on which a passenger other than the driver of the vehicle 1 sits.

The rear-view mirror 9 is an interior rear-view mirror installed on the ceiling above the windshield and configured to recognize the rear view and the rear side view. The rear-view mirror 9 is an electronic inner mirror, and displays a captured image of the rear of the vehicle, which is captured by a camera installed on an upper portion of a rear window, for example. The rear-view mirror 9 also has a function of displaying a warning about approach of another vehicle. The rear-view mirror is also referred to as a rearview mirror or the like.

The engine switch 10 is operated by the driver when starting the engine of the vehicle 1. The engine switch 10 is also referred to as an ignition switch. The driver's operation on the engine switch 10 allows the vehicle 1 to start or stop the engine. In addition, operating the engine switch 10 will control power supply to electronic devices mounted on the vehicle 1 and the like.

The steering wheel 11 is a steering wheel installed on a dashboard in front of the seat 4 for the purpose of steering the vehicle 1.

The gear shift lever 12 is operated when the driver changes gear positions. Examples of positions in the movable range of the gear shift lever 12 include a parking position, a reverse position, a neutral position, and a drive position. In a state where the gear shift lever 12 is located in the parking position, the vehicle is in a parking state in which power of the engine of the vehicle 1 is not transmitted to the wheels 3. When the gear shift lever 12 is located in the reverse position, the vehicle 1 can move backward. When the gear shift lever 12 is located at the drive position, the vehicle 1 can move forward.

The parking brake 13 is one of braking mechanisms of the vehicle 1. The parking brake 13 is a manual braking mechanism for the driver to manually stop the movement of the vehicle 1. With the parking brake 13 applied, the vehicle 1 stops movement in a parked state. With the parking brake 13 released, the vehicle 1 is movable. The parking brake is also referred to as a hand brake.

The door lock device 14 is a device that switches a door provided in the vehicle 1 between a locked state and an unlocked state. For example, the door of the vehicle 1 is switched to the locked state or the unlocked state from the outside of the vehicle 1 by a dedicated key to the vehicle 1 or the like.

The display device 15 is a display device such as a liquid crystal display (LCD) or an Organic Electro-Luminescent (EL) Display (GELD) installed on a dashboard or the like in front of the seat 4. The display device 15 has functions such as an audio output function and an input function in addition to an image display function. Moreover, the display device 15 has a function of displaying a warning about approach of another vehicle.

Note that the audio output function of the display device 15 may be implemented by a speaker 19 illustrated in FIG. 5 to be described below. Furthermore, the display device 15 may be configured as a touch panel having an input function of receiving user's operation input. Furthermore, the display device 15 may include a navigation device having a position information acquisition function and a route search function using map information.

The vehicle control device 20 is an electronic control unit (ECU) that controls various operations of the vehicle 1 or an on board unit (OBU). The vehicle control device 20 according to the present embodiment controls vehicle approach warning processing for detecting and warning of an approach of another vehicle to the vehicle 1. Here, the vehicle 1 is an example of an own vehicle. In the present embodiment, a case where the other vehicle approaches the vehicle 1 from behind will be described as an example. That is, the vehicle approach warning processing using a captured image of the imaging unit 6b that captures the rear of the vehicle 1 will be described. However, this vehicle approach warning processing can also be applied to a case where the other vehicle approaches the vehicle 1 from the front, that is, a case where the vehicle 1 mainly approaches the other vehicle in front. In this case, the vehicle approach warning processing is executed using a captured image of the imaging unit 6a that images the front of the vehicle 1. When the vehicle approach warning processing is applied to a case where the vehicle 1 approaches the other vehicle ahead, for example, it is possible to appropriately emit a warning about the approach to the vehicle ahead when visibility is low in front of the vehicle 1 due to a weather condition such as dense fog, making it possible to enhance the safety of driving.

Outline of Warning Operation of Vehicle

FIG. 2 is a diagram illustrating an outline of a warning operation in the vehicle according to the embodiment; An outline of a warning operation in the vehicle 1 according to the present embodiment will be described with reference to FIG. 2.

In an example illustrated in FIG. 2(a), the vehicle 1 being an own vehicle is traveling in a lane LN1 on the right side of a lane boundary line L. In other words, the lane LN1 is the own lane. On the other hand, another vehicle 30, which is a vehicle other than the vehicle 1, is traveling in a lane LN2 on the left side of the lane boundary line L. In this case, the lane LN2 is the other lane with respect to the lane LN1, which is the own lane in which the vehicle 1 travels. Even when the other vehicle 30 approaches the vehicle 1 and enters the vehicle detection range of the vehicle 1, as long as the other vehicle 30 is traveling in the lane LN2 being the other lane, there is a low risk of collision or contact with the vehicle 1. Accordingly, in this case, the vehicle 1 does not emit an approach warning regarding the other vehicle to the driver. Here, the vehicle detection range is a view angle range of the imaging unit 6b that images the rear of the vehicle 1.

In the example illustrated in FIG. 2(b), the vehicle 1 is traveling in the lane LN1 on the right side of the lane boundary line L. In other words, the lane LN1 is the own lane. On the other hand, the other vehicle 30, which is another vehicle, is traveling in the lane LN1 similarly. In this case, when the other vehicle 30 approaches the vehicle 1 and enters the vehicle detection range of the vehicle 1, there is a risk of collision or contact of the other vehicle 30 with the vehicle 1. Accordingly, in this case, the vehicle 1 emits an approach warning regarding the other vehicle 30 to the driver.

In this manner, the vehicle 1 according to the present embodiment executes the vehicle approach warning processing, in which the lane boundary line L is detected based on the captured image captured by the imaging unit 6b, the position of the other vehicle 30 is determined, whether there is a need to give a warning is determined, and a warning is emitted only when there is a need to give a warning. Details of the vehicle approach warning processing will be described below. Note that the lane boundary line L includes not only a boundary line that divides such as a traveling lane and a passing lane on a multi-lane road, but also a line such as a center line being a boundary with an opposite lane and a boundary line with a roadside strip. Accordingly, although FIG. 2 illustrates an example of a road with multiple lanes on each side, the type of road is not limited thereto. The vehicle approach warning processing of the vehicle control device 20 according to the present embodiment is also applicable to a road with one lane on each side.

Problem that can Occur with Narrow Vehicle Detection Range

FIGS. 3 and 4 are diagrams illustrating a problem that can occur with a narrow vehicle detection range. With reference to FIGS. 3 and 4, problems caused by a narrow detection range in the conventional technique will be described. Note that, here, description will be given focusing on the view angle range of the imaging device, as an example of the detection range. The view angle range of the imaging device is also a range captured by the imaging device. The imaging device is, for example, a camera.

FIG. 3 illustrates a state in which a mirrored image of an image captured by an imaging device installed behind the vehicle is displayed toward the driver. As illustrated in FIG. 3, the imaging device has a view angle of 65°, for example. In this case, the range captured by the imaging device includes an area CAR, an area RAR located on the left side of the area CAR, and an area LAR located on the right side of the area CAR.

As described above, a method of narrowing the detection range is conceivable in order to suppress a case where the warning for the vehicle that has entered the detection range is treated as an ordinary event. As an example, as illustrated in FIG. 3, there is a method of narrowing the view angle of the imaging device. In the example illustrated in FIG. 3, the view angle of the imaging device is narrowed to 20°. In this case, the range captured by the imaging device is only the area CAR illustrated in FIG. 3. Therefore, the own vehicle cannot predict danger of an object such as a vehicle included in the area RAR and the area LAR outside the detection area.

Figure 4A:
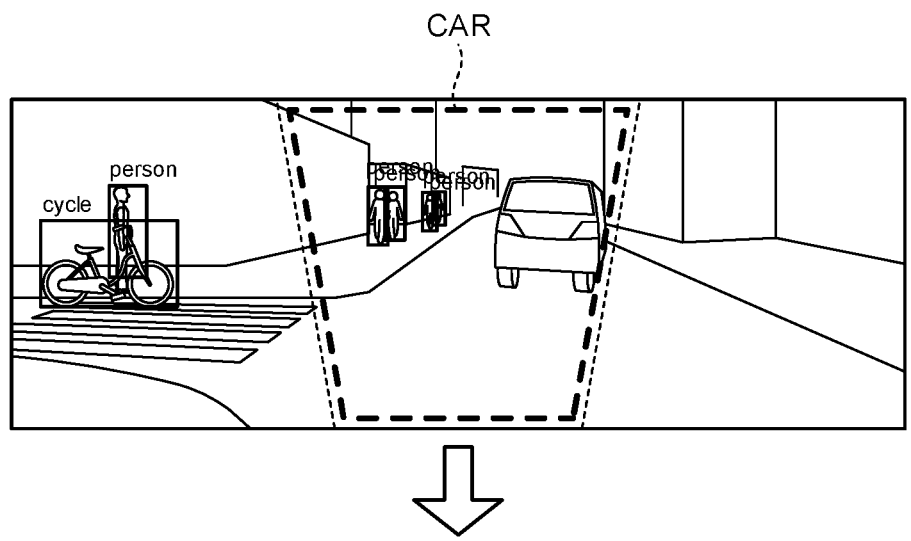
FIGS. 4(a)-4(b) are diagrams illustrating a problem that can occur with a narrow vehicle detection range.
Figure 4B:
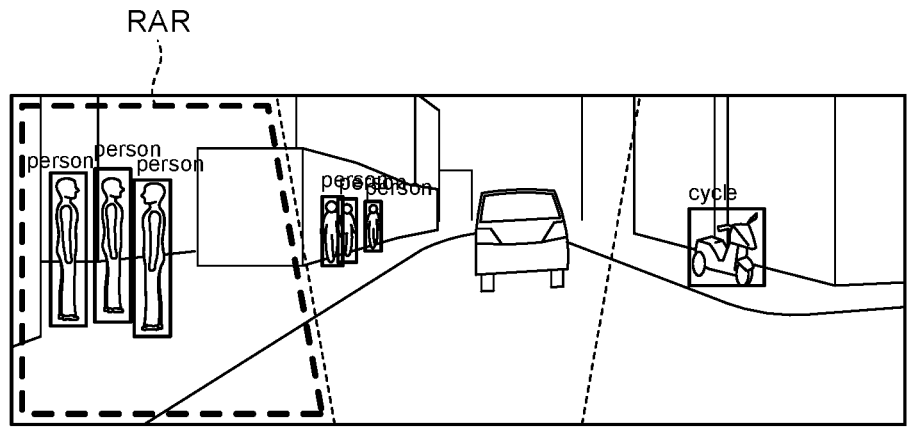

FIG. 4 illustrates a state in which a mirrored image of an image captured by an imaging device installed behind the vehicle is displayed toward the driver. FIG. 4 illustrates a state in which, as the own vehicle moves forward, the object included in the area CAR (refer to FIG. 4(a)) is not to be included in the area CAR but included in the area RAR (refer to FIG. 4(b)). In this case, the imaging device having the view angle of 20° cannot capture the area RAR, and thus cannot detect the object included in the area RAR. Consequently, when the object included in the area CAR is now included in the area RAR due to the approach of the own vehicle to the object, the own vehicle cannot predict the danger regarding the object even though the own vehicle is approaching the object.

In order to solve such a problem caused by narrowing the view angle, the vehicle 1 according to the present embodiment does not adopt a method of narrowing the view angle of the imaging device (for example, the imaging unit 6b), but adopts a method of determining whether it is necessary to emit a warning, thereby executing an operation of emitting a warning only when necessary.

Hardware Configuration of Vehicle Control Device

Figure 5:
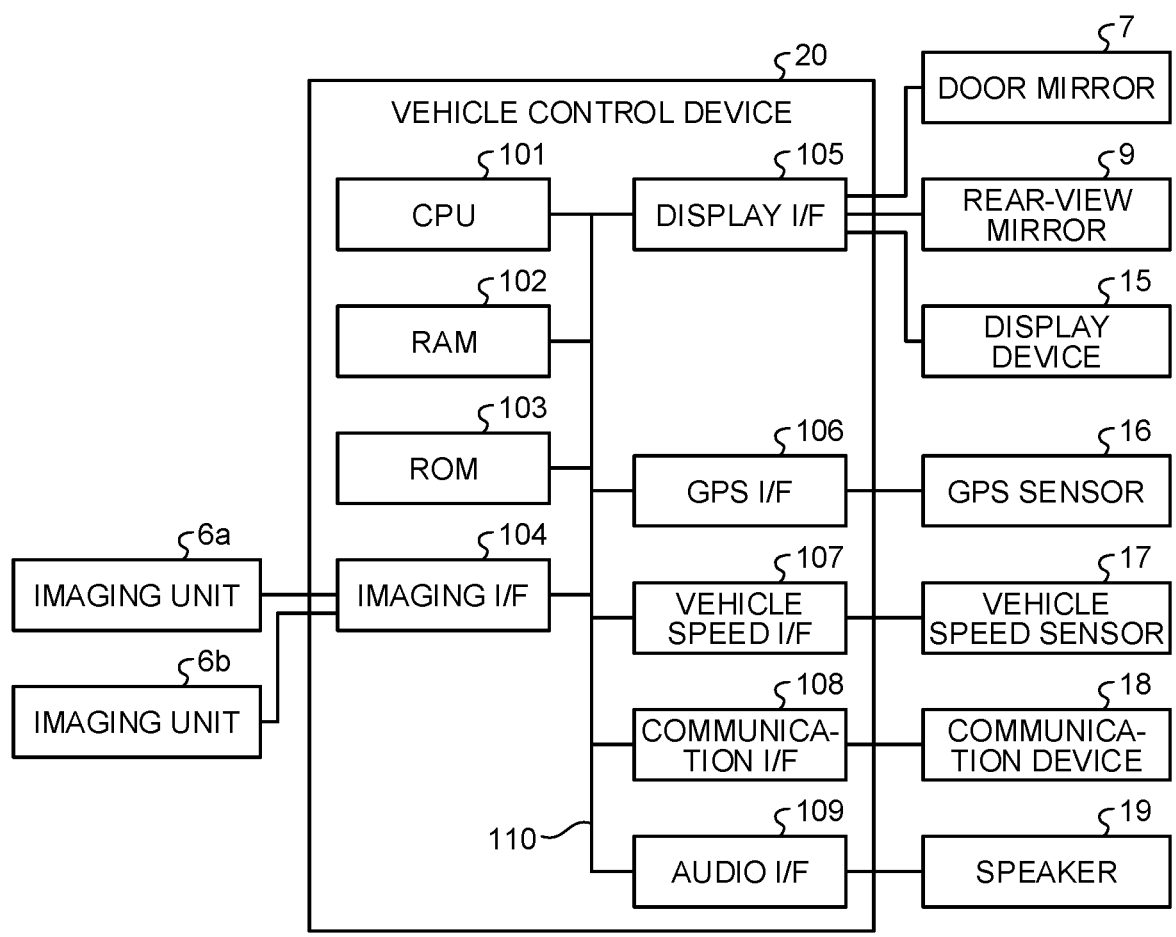
FIG. 5 is a diagram illustrating an example of a hardware configuration of the vehicle control device according to the embodiment.

FIG. 5 is a diagram illustrating an example of a hardware configuration of the vehicle control device according to the embodiment. A hardware configuration of the vehicle control device 20 according to the present embodiment will be described with reference to FIG. 5.

As illustrated in FIG. 5, the vehicle control device 20 includes a central processing unit (CPU) 101, random access memory (RAM) 102, read only memory (ROM) 103, an imaging I/F 104, a display I/F 105, a global positioning system (GPS) I/F 106, a vehicle speed I/F 107, a communication I/F 108, and an audio I/F 109. The CPU 101, the RAM 102, the ROM 103, the imaging I/F 104, the display I/F 105, the GPS I/F 106, the vehicle speed I/F 107, the communication I/F 108, and the audio I/F 109 are connected to each other via a bus 110 so as to enable data communication.

The CPU 101 is an arithmetic device that controls the entire vehicle control device 20. The RAM 102 is a volatile storage device serving as a work area for processing by the CPU 101. The ROM 103 is a non-volatile storage device that stores a control program, various data, and the like of the vehicle control device 20.

The imaging I/F 104 is an interface for receiving captured images captured by the imaging unit 6a and the imaging unit 6b. The imaging I/F 104 receives captured images captured by the imaging unit 6a and the imaging unit 6b continuously as frame images to receive the captured images as moving images.

The display I/F 105 is an interface for displaying various displays such as a warning display by the vehicle approach warning processing. For example, as illustrated in FIG. 5, the display I/F 105 is connected to the door mirror 7, the rear-view mirror 9, and the display device 15.

The GPS I/F 106 is an interface for receiving position information received by a GPS sensor 16 installed in the vehicle 1. An example of the position information received by the GPS sensor 16 is a GPS signal. The vehicle speed I/F 107 is an interface for receiving speed information from a vehicle speed sensor 17 that detects the vehicle speed of the vehicle 1. An example of the vehicle speed sensor 17 is a vehicle speed detection unit that is installed near the wheel 3 and generates a vehicle speed pulse indicating the rotation speed or the revolutions per minute of the wheel 3. The vehicle speed I/F 107 receives the vehicle speed pulse generated by the vehicle speed sensor 17, and obtains the traveling speed of the vehicle 1 based on the vehicle speed pulse.

The communication I/F 108 is an interface for transmitting and receiving data to and from a communication device 18 installed in the vehicle 1. The communication device 18 performs data communication with an external device such as a server by wireless communication. This makes it possible for the communication I/F 108 to perform data communication with an external device via the communication device 18.

The audio I/F 109 is an interface for outputting audio data to the speaker 19 installed in the vehicle 1.

Note that the hardware configuration of the vehicle control device 20 illustrated in FIG. 5 is an example, and thus, there is no need to include all the components illustrated in FIG. 2, or it is also allowable to include a component not illustrated.

Configuration and Operation of Functional Blocks of Vehicle Control Device

FIG. 6 is a diagram illustrating an example of a configuration of functional blocks of the vehicle control device according to the embodiment. FIG. 7 is a diagram illustrating an example of a pattern of emitting a warning in the vehicle control device according to the embodiment. FIG. 8 is a diagram illustrating an example of a pattern of not emitting a warning in the vehicle control device according to the embodiment. FIG. 9 is a diagram illustrating a case where a warning is unnecessary when the other vehicle moves away with respect to the vehicle according to the embodiment. FIG. 10 is a diagram illustrating an operation of changing a timing of emitting a warning in accordance with an absolute speed of the other vehicle in the vehicle according to the embodiment. The configuration and operation of the functional blocks of the vehicle control device 20 according to the present embodiment will be described with reference to FIGS. 6 to 10.

As illustrated in FIG. 6, the vehicle control device 20 includes a vehicle detection module 201, a detected vehicle information reception module 202, an approach warning determination module 203, and an output control module 204.

The vehicle detection module 201 is a functional module that detects the position of the other vehicle based on a captured image received from the imaging unit 6 configured to capture an image around the vehicle 1 being the own vehicle. The vehicle detection module 201 corresponds to a first detection module and a second detection module. For example, the vehicle detection module 201 detects the position of the other vehicle by image processing based on template matching using template images of vehicles prepared in advance. Here, other vehicles include not only four-wheeled vehicles such as passenger cars and trucks but also two-wheeled vehicles such as scooters and motorcycles. In addition, based on the captured image received from the imaging unit 6, the vehicle detection module 201 detects the position of the lane boundary line indicating the boundary in the width direction of the road on which the vehicle 1 being the own vehicle travels. The vehicle detection module 201 is implemented by executing a control program by the CPU 101 illustrated in FIG. 5, for example.

The detected vehicle information reception module 202 is a functional module that receives relative speed information and absolute speed information of the detected vehicle, distance information from the vehicle 1 being the own vehicle to the detected vehicle, position information of the detected vehicle, and position information of the detected lane boundary line based on the positions of the other vehicle and the lane boundary line detected by the vehicle detection module 201 and the speed information of the vehicle 1 received from the vehicle speed sensor 17. Hereinafter, the other vehicle detected by the vehicle detection module 201 is referred to as a detected vehicle. Hereinafter, the position information of the lane boundary line is referred to as lane position information. The detected vehicle information reception module 202 corresponds to a first reception module and a second reception module. Among the information, the relative speed information, the absolute speed information, the distance information, and the position information, which are information regarding the detected vehicle, are referred to as detected vehicle information.

The relative speed of the detected vehicle with respect to the vehicle 1 being the own vehicle is obtained from the change in the position of the detected vehicle in the captured image. For example, in a case where the imaging unit 6 is a stereo camera, the relative speed of the detected vehicle is obtained by a temporal change in the distance indicated by a parallax based on parallax information obtained from the stereo camera. The speed information obtained from the vehicle speed sensor 17 is to be the absolute speed information of the vehicle 1 as it is. Furthermore, for example, in a case where the imaging unit 6 is a stereo camera, the distance indicated by the parallax corresponding to the detected vehicle based on the parallax information obtained from the stereo camera is to be the distance to the detected vehicle.

The detected vehicle information reception module 202 is implemented by executing the control program by the CPU 101 illustrated in FIG. 5, for example.

The approach warning determination module 203 is a functional module that determines whether to emit a warning about the approaching other vehicle to the driver of the vehicle 1 using the detected vehicle information and the lane position information received by the detected vehicle information reception module 202. As illustrated in FIG. 6, the approach warning determination module 203 includes an approach determination module 203a, a traveling state determination module 203b, and a distance determination module 203c. The approach warning determination module 203 is implemented by executing the control program by the CPU 101 illustrated in FIG. 5, for example.

Figure 9A:
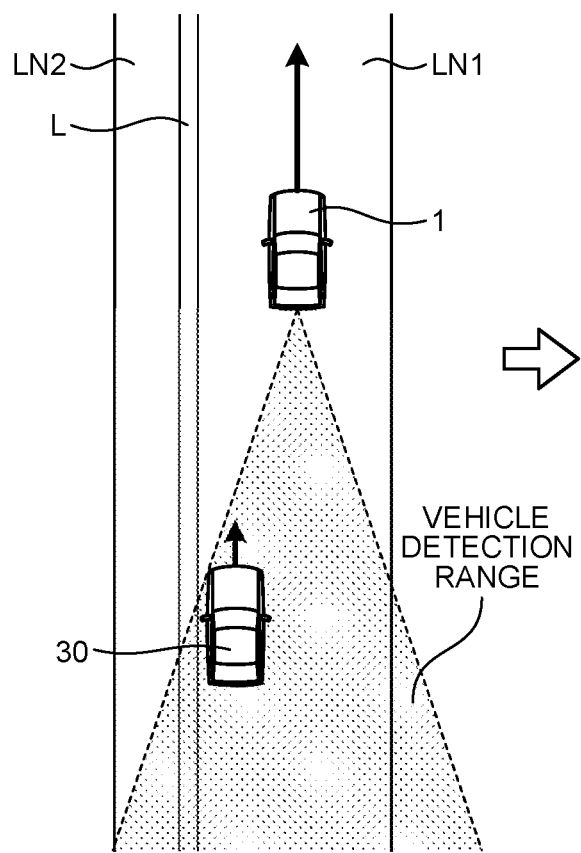
FIGS. 9(a)-9(b) are diagrams illustrating a case where a warning is unnecessary when another vehicle moves away with respect to the vehicle according to the embodiment.
Figure 9B:
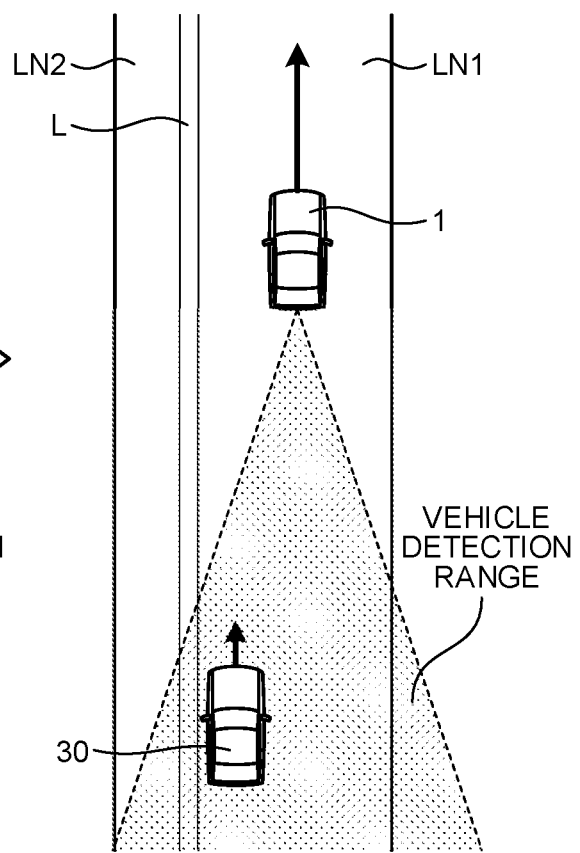

The approach determination module 203a is a functional module that determines whether the detected vehicle is approaching the vehicle 1 being the own vehicle. The approach determination module 203a corresponds to a second determination module. Specifically, the approach determination module 203a can determine whether the detected vehicle is approaching the vehicle 1 based on the relative speed information of the detected vehicle received by the detected vehicle information reception module 202. For example, as illustrated in FIG. 9(a), even when the other vehicle 30 traveling in the same lane LN1 as the vehicle 1 is within a vehicle detection range of the vehicle 1, in a case where the relative speed of the other vehicle 30 is negative, that is, in a case where the other vehicle 30 moves away from the vehicle 1 as illustrated in FIG. 9(b), the possibility of collision or contact with the vehicle 1 is low, and thus there is no need to emit a warning to the driver.

The traveling state determination module 203b is a functional module that determines the traveling states of the vehicle 1 and the detected vehicle using the detected vehicle information and the lane position information received by the detected vehicle information reception module 202. That is, whether there is a need to emit a warning to the driver regarding the approach of the detected vehicle based on the traveling states of the vehicle 1 and the detected vehicle determined by the traveling state determination module 203b. The traveling state determination module 203b corresponds to a first determination module.

Figure 7A:
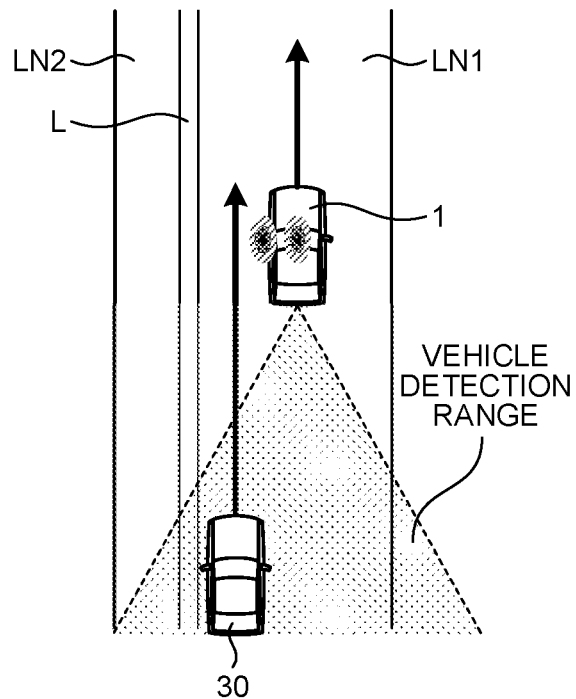
FIGS. 7(a)-7(d) are diagrams illustrating an example of a pattern of emitting a warning in the vehicle control device according to the embodiment.
Figure 7B:
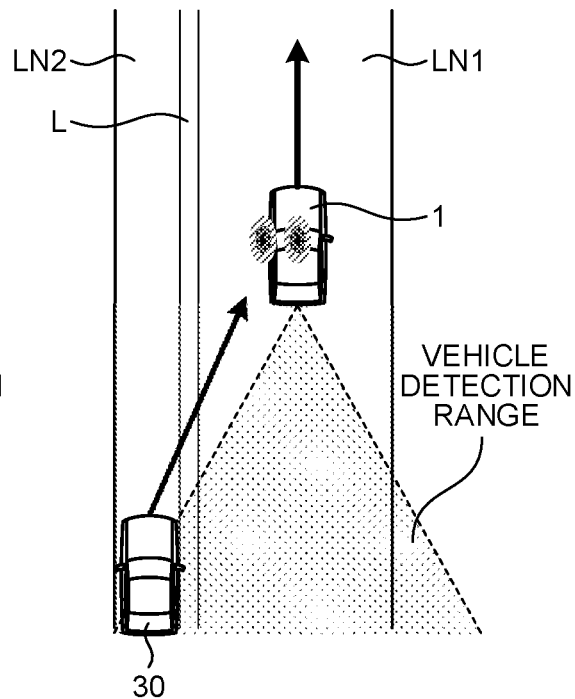
Figure 7C:
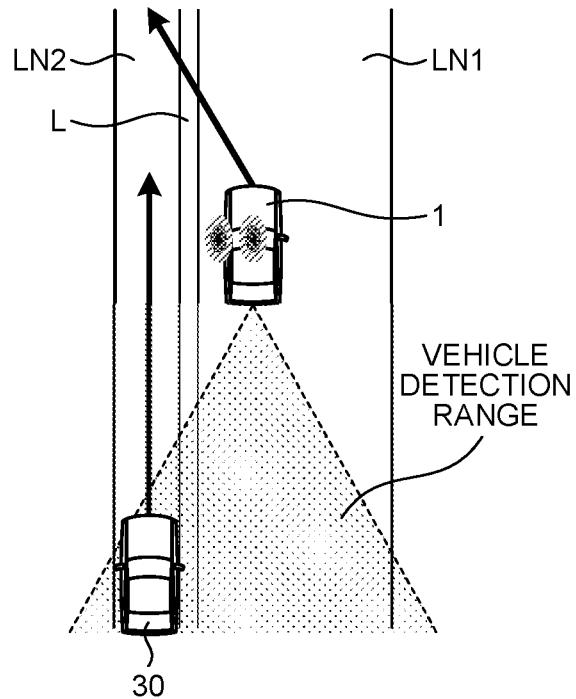
Figure 7D:
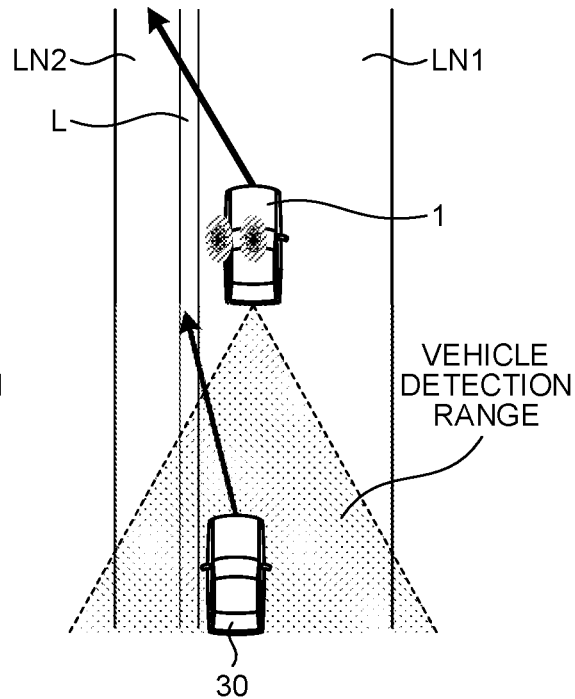
Figure 8A:
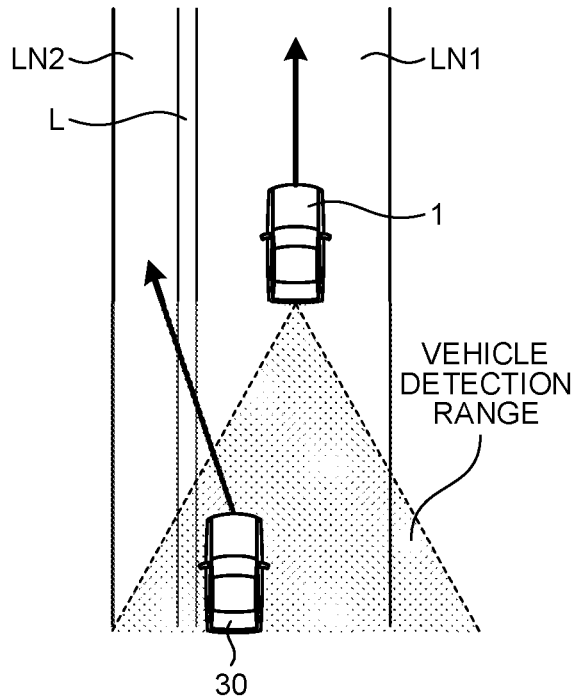
FIGS. 8(a)-8(d) are diagrams illustrating an example of a pattern of not emitting a warning in the vehicle control device according to the embodiment.
Figure 8B:
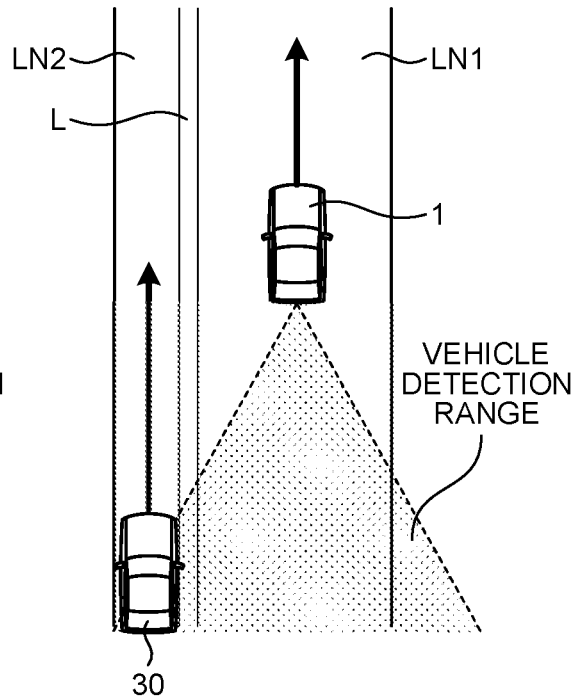
Figure 8C:
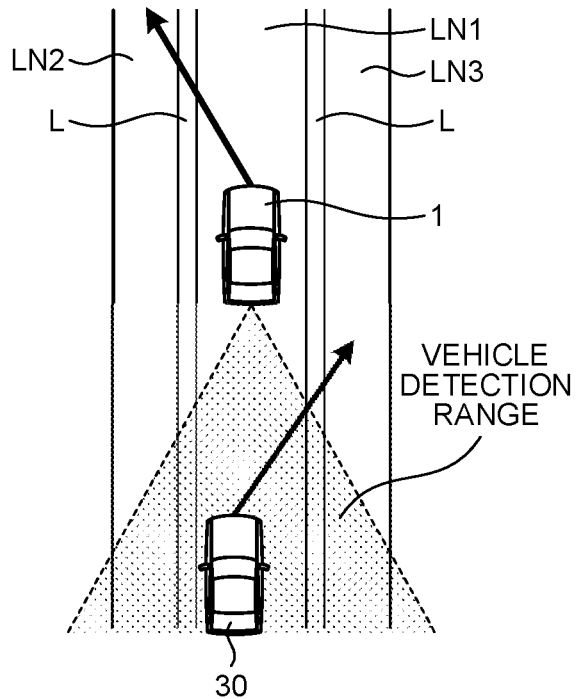
Figure 8D:
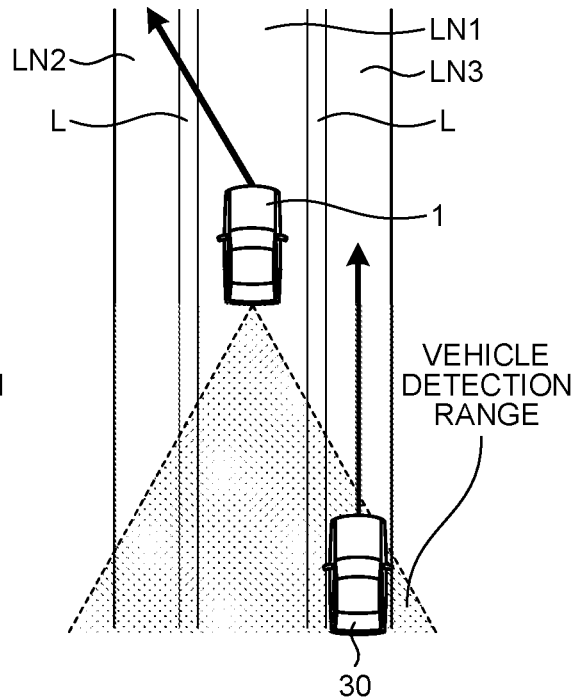

For example, FIG. 7 illustrates a pattern of a traveling state when there is a need to emit a warning of approach of the other vehicle 30 FIG. 7(a) illustrates a pattern of a traveling state in which the other vehicle 30 approaching the vehicle 1 is traveling straight in the same lane LN1 as the vehicle 1. FIG. 7(b) illustrates a pattern of a traveling state in which the other vehicle 30 approaching the vehicle 1 moves, across the lane boundary line L, from the lane LN2, which is the other lane, to the lane LN1 in which the vehicle 1 is traveling. In other words, in FIG. 7(b), the other vehicle 30 is changing the lane from the lane LN2 to the lane LN1. FIG. 7(c) illustrates a pattern of a traveling state in which the vehicle 1 being an own vehicle moves, across the lane boundary line L, from the lane LN1 to the lane LN2 in which the other vehicle 30 approaching the vehicle 1 is traveling. In other words, in FIG. 7(c), the vehicle 1 is changing the lane from the lane LN1 to the lane LN2. FIG. 7(d) illustrates a pattern of a traveling state in which the vehicle 1 being the own vehicle and the other vehicle both move to the lane LN2 across the lane boundary line L from a state of traveling in the same lane LN1. In other words, in FIG. 7(d), both the vehicle 1 and the other vehicle 30 are changing lanes from the lane LN1 to the lane LN2. In any of the patterns of FIGS. 7(a) to 7(d), the state is a traveling state in which the vehicle 1 and the other vehicle 30 are traveling in the same lane or come to a state of traveling in the same lane as a result of their movements. Therefore, since there is a risk of collision or contact of the other vehicle 30 with the vehicle 1, there is a need to emit a warning to the driver.

In contrast, FIG. 8 illustrates a pattern of a traveling state in a case where there is no need to emit a warning of approach of the other vehicle 30. FIG. 8(a) illustrates a pattern of a traveling state in which the other vehicle 30 approaching the vehicle 1 moves, across the lane boundary line L from the same lane LN1 as the vehicle 1 to the lane LN2 being the other lane. In other words, in FIG. 8(a), the other vehicle 30 changes the lane from the lane LN1 to the lane LN2. FIG. 8(b) illustrates a pattern of a traveling state in which the other vehicle 30 approaching the vehicle 1 is traveling straight on the lane LN2 different from the lane LN1 on which the vehicle 1 is traveling. FIG. 8(c) illustrates a pattern of a traveling state in which the vehicle 1 moves to the lane LN2 and the other vehicle 30 moves to a lane LN3 from a state in which both the vehicle 1 and the other vehicle 30 approaching the vehicle 1 are traveling on the lane LN1. In other words, in FIG. 8(c), the vehicle 1 changes the lane from the lane LN1 to the lane LN2, while the other vehicle 40 changes the lane from the lane LN1 to the lane LN3. FIG. 8(d) illustrates a pattern of a traveling state in which the vehicle 1 moves to the lane LN2 from a state in which the vehicle 1 is traveling in the lane LN1 and the other vehicle 30 approaching the vehicle 1 is traveling in the lane LN3 different from the lane LN1. In other words, in FIG. 8(d), the vehicle 1 changes the lane from the lane LN1 to the lane LN2. In any of the patterns of FIGS. 8(a) to 8(d), the state is a traveling state in which the vehicle 1 and the other vehicle 30 are traveling in different lanes or come to a state of traveling in the different lanes as a result of their movement. Therefore, since there is a low risk of collision or contact of the other vehicle 30 with the vehicle 1, there is no need to emit a warning to the driver.

The distance determination module 203c is a functional module that performs determination such that, when the traveling state determination module 203b has determined that the warning of the approach of the detected vehicle is necessary, the distance determination module 203c determines whether the distance between the detected vehicle and the vehicle 1 is within a predetermined distance range based on the distance information of the detected vehicle received by the detected vehicle information reception module 202. That is, when the distance between the detected vehicle and the vehicle 1 is not within the predetermined distance range, the distance determination module 203c determines that the risk of collision or contact is low and there is no need to emit a warning to the driver. The distance determination module 203c corresponds to a third determination module. Hereinafter, a predetermined distance range between the detected vehicle and the vehicle 1 by which the distance determination module 203c determines the necessity of emitting a warning to the driver may be referred to as a warning range.

The distance determination module 203c may change the warning range according to the absolute speed of the detected vehicle received by the detected vehicle information reception module 202. For example, as illustrated in FIG. 10(a), when the absolute speed of the detected vehicle is high, the distance determination module 203c performs the above determination with an increased warning range. In contrast, as illustrated in FIG. 10(b), when the absolute speed of the detected vehicle is low, the distance determination module 203c performs the above determination with a decreased warning range. This makes it possible for the vehicle control device 20 to emit a warning to the driver earlier when the absolute speed of the detected vehicle is high. Therefore, the driver can take appropriate measures with an appropriate time margin. The distance determination module 203c may change the warning range according to the relative speed of the detected vehicle received by the detected vehicle information reception module 202. For example, the distance determination module 203c may increase the warning range in a case of a high relative speed of the detected vehicle because an early warning is necessary, and may decrease the warning range in a case of a low relative speed of the detected vehicle because an early warning is unnecessary.

Furthermore, the distance determination module 203c may determine the weather condition from the captured image obtained from the imaging unit 6, or may change the warning range using the weather information obtained by the communication device 18. In this case, for example, the distance determination module 203c may increase the warning range when having determined that the weather is rainy. This is because of an increased braking distance of the approaching other vehicle in the rainy condition. This makes it possible for the vehicle control device 20 to emit an early warning to the driver. Therefore, the driver can take appropriate measures with an appropriate time margin.

The distance determination module 203c may change the warning range according to the type of the other vehicle detected by the vehicle detection module 201. Examples of the other vehicle include a large vehicle, a small vehicle, a motorcycle, and a bicycle. In this case, for example, the distance determination module 203c may increase the warning range when a large vehicle approaches as another vehicle. This is because a large vehicle has a long braking distance. This makes it possible for the vehicle control device 20 to emit an early warning to the driver. Therefore, the driver can take appropriate measures with an appropriate time margin. In addition, the determination of the type of the other vehicle by the distance determination module 203c may be based on vehicle type information received by vehicle-to-vehicle communication in addition to the image recognition on the captured image.

The distance determination module 203c may change the warning range according to the type of the vehicle 1 being the own vehicle. Examples of the type of the vehicle 1 include a large vehicle and a small vehicle. In this case, for example, the distance determination module 203c may increase the warning range when the vehicle width or the vehicle length of the vehicle 1 is large. This is because when the vehicle width or the vehicle length of the vehicle 1 is larger, the vehicle 1 has a larger weight and a longer braking distance. In addition, a large vehicle width or a large vehicle length increases the distance between the camera attachment position and the own vehicle end, leading to a concern that the approaching vehicle will be too close to the own vehicle without increasing the warning range. This makes it possible for the vehicle control device 20 to emit an early warning to the driver. Therefore, the driver can take appropriate measures with an appropriate time margin.

In addition, the approach warning determination module 203 may change the warning range according to the driver's driving history or driving skill. In this case, for example, in a case where the driver's driving history is long or the driving skill is high, the distance determination module 203c may decrease the warning range. This is because it is considered that there is low risk even with a lowered warning frequency in a case where the driver's driving history is long or the driving skill is high. This makes it possible for the vehicle control device 20 to set the warning frequency according to the driving history or the driving skill of the driver. In this case, the driving history, the driving skill, or the warning range may be set as selective settings via the display device 15 being a touch panel, for example.

The output control module 204 is a functional module that performs control to output a warning to the driver of the vehicle 1 being the own vehicle based on a relationship between the position of the lane boundary line detected by the vehicle detection module 201 and the position of the other vehicle. Specifically, when the approach warning determination module 203 has determined that there is a need to emit a warning about the approaching other vehicle, the output control module 204 outputs a warning to the driver of the vehicle 1. For example, the output control module 204 controls to display a warning on the door mirror 7, the rear-view mirror 9, and the display device 15, which are examples of the display device, and controls to output an audio indicating a warning from the speaker 19, which is an audio output device. The output control module 204 does not need to control to output the warning from all of the door mirror 7, the rear-view mirror 9, the display device 15, and the speaker 19; it is allowable to control to output a warning from at least any one of these. The output control module 204 is implemented by execution of the control program by the CPU 101 illustrated in FIG. 5, for example.

Some or all of the vehicle detection module 201, the detected vehicle information reception module 202, the approach warning determination module 203, and the output control module 204 described above may be implemented by a hardware circuit such as a field-programmable gate array (FPGA) or an application specific integrated circuit (ASIC) instead of a software program.

In addition, each of the functional modules of the vehicle control device 20 illustrated in FIG. 6 is a conceptual illustration of the function and is not limited to such a configuration. For example, a plurality of functional modules illustrated as independent functional modules in the vehicle control device 20 illustrated in FIG. 6 may be configured as one functional module. On the other hand, in the vehicle control device 20 illustrated in FIG. 6, the function of one functional module may be divided into a plurality of units and configured as a plurality of functional modules.

Vehicle Approach Warning Processing of Vehicle Control Device

Figure 11:
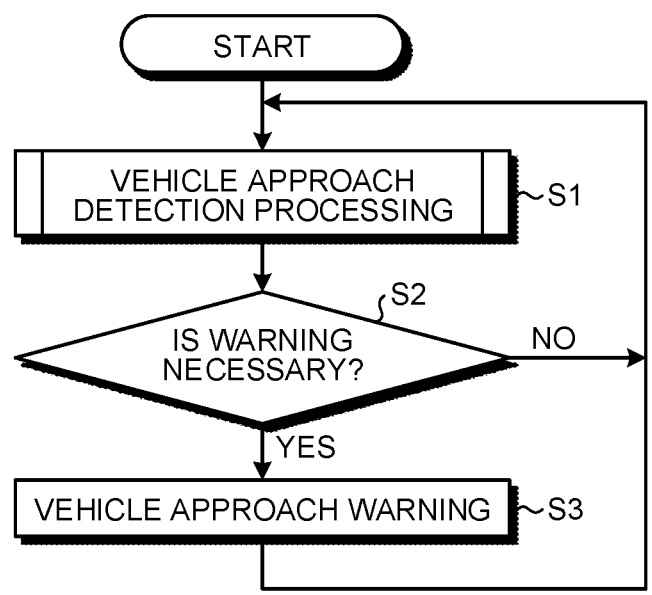
FIG. 11 is a diagram illustrating an example of a flow of vehicle approach warning processing of the vehicle control device according to the embodiment.
Figure 12:
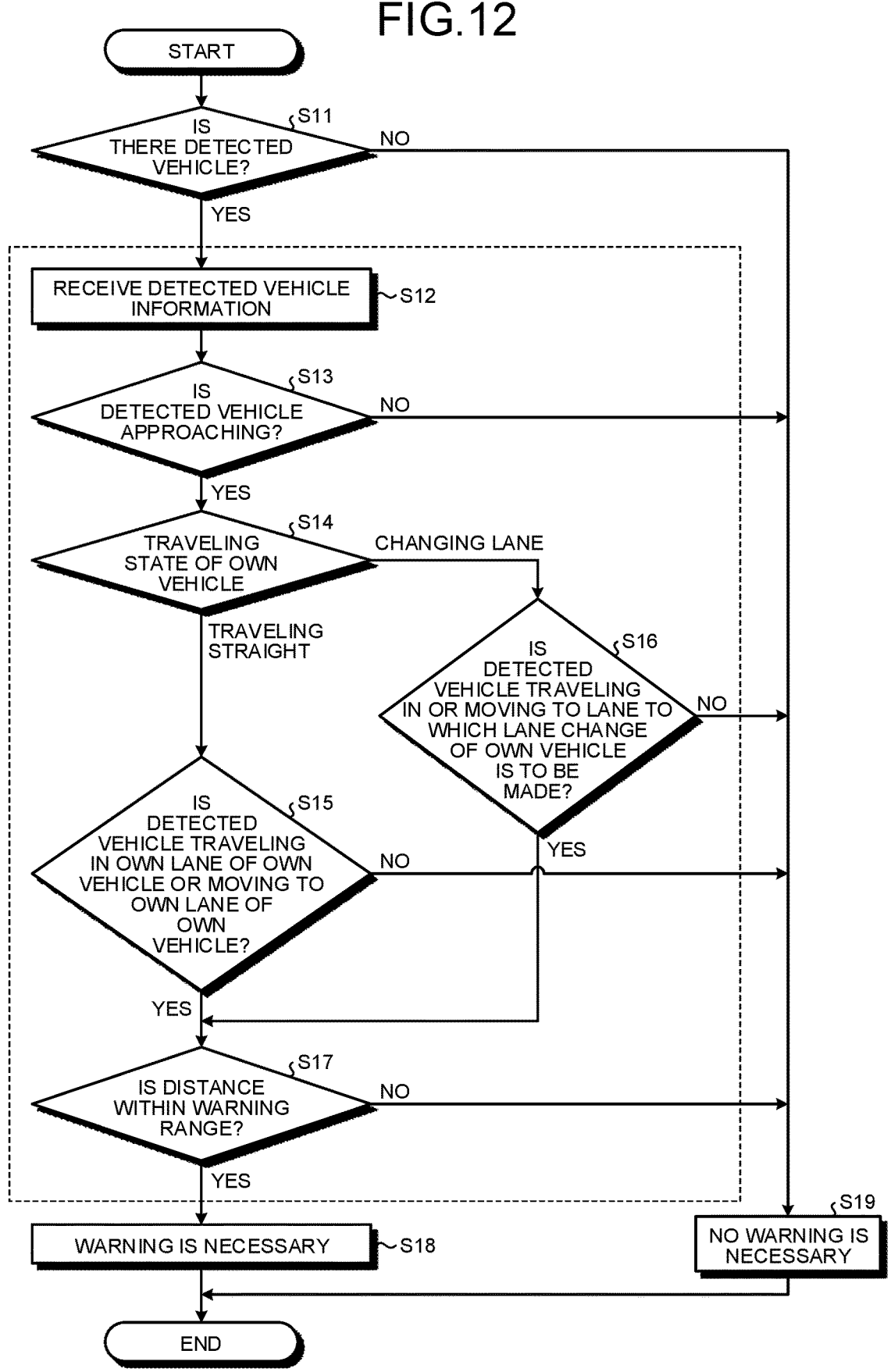
FIG. 12 is a diagram illustrating an example of a flow of the vehicle approach detection processing of the vehicle control device according to the embodiment.

FIG. 11 is a diagram illustrating an example of a flow of vehicle approach warning processing of the vehicle control device according to the embodiment. FIG. 12 is a diagram illustrating an example of a flow of vehicle approach detection processing of the vehicle control device according to the embodiment. A flow of a vehicle approach warning processing of the vehicle control device 20 according to the present embodiment will be described with reference to FIGS. 11 and 12.

Step S1

The vehicle control device 20 executes vehicle approach detection processing, and thereby determines whether there is another vehicle approaching the vehicle 1 and whether there is a need to emit a warning about an approaching other vehicle to the driver of the vehicle 1. The vehicle approach detection processing will be described below with reference to FIG. 12. The processing proceeds to step S2.

Step S2

When the vehicle approach detection processing has determined that it is necessary to emit a warning (step S2: yes), the processing proceeds to step S3, and when determined as not necessary (step S2: no), the processing returns to step S1. When the output control module 204 is outputting a warning at the time of returning to step S1, the output of the warning is stopped, and the processing returns to step S1.

Step S3

The output control module 204 of the vehicle control device 20 outputs a warning about the approaching other vehicle to the driver of the vehicle 1. Specifically, for example, the output control module 204 controls to display a warning on the door mirror 7, the rear-view mirror 9, and the display device 15, and controls to output an audio indicating a warning from the speaker 19. Returning to step S1, the processing is repeated.

Hereinafter, a flow of a vehicle approach detection processing performed by the vehicle control device 20 according to the present embodiment will be described with reference to FIG. 12. Note that the vehicle approach detection processing illustrated in FIG. 12 is processing corresponding to step S1 illustrated in FIG. 11.

Step S11

First, the vehicle detection module 201 of the vehicle control device 20 detects the presence or absence of the other vehicle in the imaging range based on the captured image received from the imaging unit 6 configured to capture an image around the vehicle 1 being the own vehicle. In addition, based on the captured image received from the imaging unit 6, the vehicle detection module 201 detects the position of the lane boundary line indicating the boundary in the width direction of the road on which the vehicle 1 being the own vehicle travels. When the other vehicle is detected as a result (step S11: Yes), the processing proceeds to step S12; when the other vehicle is not detected (step S11: No), the processing proceeds to step S19. Hereinafter, the other vehicle detected by the vehicle detection module 201 is referred to as a detected vehicle.

Step S12

The detected vehicle information reception module 202 of the vehicle control device 20 receives detected vehicle information regarding the detected vehicle and lane position information based on the positions of the detected vehicle and the lane boundary line and the speed information regarding the vehicle 1 received from the vehicle speed sensor 17. The processing proceeds to step S13.

Step S13

The approach determination module 203a of the vehicle control device 20 determines whether the detected vehicle is approaching the vehicle 1 being the own vehicle based on the relative speed information regarding the detected vehicle received by the detected vehicle information reception module 202. When the detected vehicle is approaching the vehicle 1 (step S13: Yes), the processing proceeds to step S14. In contrast, when the detected vehicle is not approaching the vehicle 1 (step S13: No), it is determined that there is no need to emit a warning to the driver, and the processing proceeds to step S19.

Step S14

The traveling state determination module 203b of the vehicle control device 20 determines whether the vehicle 1 being the own vehicle is traveling straight on the own lane or is moving across the lane boundary line based on the position information regarding the detected vehicle and the lane position information received by the detected vehicle information reception module 202. In other words, the traveling state determination module 203b determines whether the vehicle 1 is traveling straight or changing lanes. When the vehicle 1 is traveling straight (step S14: traveling straight), the processing proceeds to step S15; when the vehicle 1 is changing the lane (step S14: changing lane), the processing proceeds to step S16.

Step S15

The traveling state determination module 203b further determines whether the detected vehicle is traveling in the own lane in which the vehicle 1 is traveling or moving to the own lane. When the detected vehicle is traveling in the own lane in which the vehicle 1 is traveling or is moving to the own lane (step S15: Yes), the processing proceeds to step S17. In contrast, when the detected vehicle is neither a vehicle traveling in the own lane of the vehicle 1 in which the vehicle 1 is traveling nor a vehicle moving to the own lane of the vehicle 1 (step S15: No), it is determined that there is no need to emit a warning to the driver, and the processing proceeds to step S19.

Step S16

When the vehicle 1 is changing lanes, the traveling state determination module 203b further determines whether the detected vehicle is traveling in the lane to which the lane change of the vehicle 1 is to be made or whether the detected vehicle is moving to the lane to which the lane change of the vehicle 1 is to be made. When the detected vehicle is a vehicle traveling in the lane to which the lane change of the vehicle 1 is to be made or the detected vehicle is a vehicle moving to the lane to which the lane change of the vehicle 1 is to be made (step S16: Yes), the processing proceeds to step S17. In contrast, when the detected vehicle is not a vehicle traveling in the lane to which the lane change of the vehicle 1 is to be made, and when the detected vehicle is not a vehicle moving to the lane to which the lane change of the vehicle 1 is to be made (step S16: No), it is determined that there is no need to emit a warning to the driver, and the processing proceeds to step S19.

That is, in the traveling state determination by the processing in steps S14 to S16, the traveling state determination module 203b determines whether the other vehicle is traveling in the lane in which the vehicle 1 being the own vehicle is traveling or whether the other vehicle and the own vehicle are going to travel in the same lane based on the position information and the lane position information received by the detected vehicle information reception module 202. It can also be said that the traveling state determination module 203b determines whether the other vehicle is in a lane in which the vehicle 1 being the own vehicle is traveling or a lane for a lane change of the own vehicle, or determines whether a lane change of the other vehicle is to be made, based on the position information and the lane position information received by the detected vehicle information reception module 202.

Step S17

The distance determination module 203c of the vehicle control device 20 determines whether the distance between the detected vehicle and the vehicle 1 is within a predetermined warning range based on the distance information regarding the detected vehicle received by the detected vehicle information reception module 202. Hereinafter, a predetermined distance range between the detected vehicle and the vehicle 1 by which the distance determination module 203c determines the necessity of emitting a warning to the driver may be referred to as a warning range. When the distance between the detected vehicle and the vehicle 1 is within the warning range (step S17: Yes), the processing proceeds to step S18. In contrast, when the distance between the detected vehicle and the vehicle 1 is out of the warning range (step S17: No), it is determined that there is no need to emit a warning to the driver, and the processing proceeds to step S19.

Step S18

As a result of the determinations by the approach determination module 203a, the traveling state determination module 203b, and the distance determination module 203c, the approach warning determination module 203 determines that there is a need to emit a warning to the driver. This completes the vehicle approach detection processing, and the processing proceeds to step S2 in FIG. 11.

Step S19

The approach warning determination module 203 determines that there is no need to emit a warning to the driver. This completes the vehicle approach detection processing, and the processing proceeds to step S2 in FIG. 11.

As described above, the vehicle control device 20 according to the present embodiment has a configuration in which the vehicle detection module 201 detects the position of the lane boundary line indicating a boundary line in the width direction of the road on which the own vehicle travels based on the captured image captured by the imaging unit 6 configured to capture an image around the vehicle 1 being the own vehicle, and detects the position of the other vehicle based on the captured image, and the output control module 204 performs control to output a warning to the driver of the own vehicle based on the relationship between the position of the lane boundary line detected by the vehicle detection module 201 and the position of the other vehicle. With this configuration, when an approaching vehicle is detected, it is possible to emit a warning when a danger is predicted while suppressing an error of always emitting a warning even when a danger is not particularly predicted.

The program executed by the vehicle control device 20 according to the above-described embodiment is provided in a state of pre-installed in ROM or the like. The programs executed by the vehicle control device 20 may be provided as a file in an installable format or an executable format, recorded in a computer readable storage medium such as CD-ROM, a flexible disk (FD), a CD-R, or a Digital Versatile Disk (DVD). Furthermore, the above-described program may be provided to the vehicle control device 20 via a network such as the Internet. In addition, the program to be executed by the vehicle control device 20 according to the above-described embodiment has a module configuration including each of the above-described functional modules. Regarding actual hardware of the vehicle control device 20, for example, when the CPU 101 reads a program from the ROM 103 and executes the program, each of the above-described plurality of functional modules is loaded onto the RAM 102 as a main storage device, and each of the above-described plurality of functional modules is generated on the RAM 102.

According to the control device, the warning control method, and the non-transitory computer-readable storage medium according to the present disclosure, warning can be emitted when danger is predicted.

The embodiments and modifications of the present disclosure that have been described are presented as examples, and are not intended to limit the technical scope of the invention. These embodiments and modifications can be implemented in various other forms, with various omissions, substitutions, changes, and combinations without departing from the scope and spirit of the invention. These embodiments and modifications are included in the scope and spirit of the invention and are included in the equivalent scope of the invention described in the claims.

What is claimed is:

1. A control device, comprising:
a memory configured to store a program; and
a processor coupled to the memory and configured to execute the program to perform processing,
the processing comprising:
receiving lane position information indicating a position of a lane boundary line;
detecting the position of the lane boundary line, the lane boundary line indicating a boundary in a width direction of a road on which an own vehicle travels, based on a captured image captured by a camera configured to capture the captured image around the own vehicle;
receiving position information indicating a position of an other vehicle;
receiving distance information of the other vehicle, the distance information being based on the position of the other vehicle;
detecting the position of the other vehicle based on the captured image, the position information, and the distance information;
performing a traveling state determination of determining whether the other vehicle and the own vehicle are traveling in a same lane or the other vehicle and the own vehicle are about to travel in the same lane, based on the lane position information and the position of the other vehicle;
determining whether a distance between the other vehicle and the own vehicle is within a predetermined distance range based on the distance information, when the processor determines that the other vehicle and the own vehicle are traveling in the same lane, or when the processor determines that the other vehicle and the own vehicle are about to travel in the same lane; and
performing control to output a warning to a driver of the own vehicle based on a relationship between the position of the lane boundary line and the position of the other vehicle,
wherein the warning is output to the driver of the own vehicle at least when the processor determines that the other vehicle and the own vehicle are traveling in the same lane or when the processor determines that the other vehicle and the own vehicle are about to travel in the same lane, and when the processor determines that the distance between the other vehicle and the own vehicle is within the predetermined distance range.

2. The control device according to claim 1, wherein the processing further comprises:
receiving relative speed information of the other vehicle based on the position of the other vehicle;
determining whether the other vehicle is approaching the own vehicle based on the relative speed information; and
performing the traveling state determination when it is determined the processor determines that the other vehicle is approaching the own vehicle.

3. The control device according to claim 1, wherein the processing further comprises:
receiving absolute speed information of the own vehicle from a vehicle speed sensor; and
changing the predetermined distance range according to the absolute speed information, and determining whether the distance between the other vehicle and the own vehicle is within the changed predetermined distance range.

4. The control device according to claim 1, wherein the processing further comprises:
receiving relative speed information of the other vehicle based on the position of the other vehicle; and
changing the predetermined distance range according to the relative speed information, and determining whether the distance between the other vehicle and the own vehicle is within the changed predetermined distance range.

5. The control device according to claim 1, wherein the processing further comprises:
changing the predetermined distance range based on the captured image or weather information obtained by a communication device, and determining whether the distance between the other vehicle and the own vehicle is within the changed predetermined distance range.

6. The control device according to claim 1, wherein the processing further comprises:
changing the predetermined distance range according to the captured image or a type of the other vehicle based on vehicle type information obtained by communication with the other vehicle by a communication device, and determining whether the distance between the other vehicle and the own vehicle is within the changed predetermined distance range.

7. The control device according to claim 1, wherein the processing further comprises:
changing the predetermined distance range according to a type of the own vehicle, and determining whether the distance between the other vehicle and the own vehicle is within the changed predetermined distance range.

8. The control device according to claim 1, wherein the processing further comprises;
changing the predetermined distance range according to a preset driving history or a preset driving skill of the driver of the own vehicle, and determining whether the distance between the other vehicle and the own vehicle is within the changed predetermined distance range.

9. The control device according to claim 1, wherein the processing further comprises, as the traveling state determination:
determining whether the other vehicle is in a first lane in which the own vehicle is traveling or a second lane for a first lane change of the own vehicle, or determining whether a second lane change of the other vehicle is to be made, based on the lane position information and the position information.

10. The control device according to claim 1, wherein the processing further comprises:
controlling display of the warning on a display device, as the output of the warning to the driver of the own vehicle.

11. The control device according to claim 1, wherein the processing further comprises:
controlling output of audio indicating the warning from an audio output device, as the output of the warning to the driver of the own vehicle.

12. A warning control method, comprising:
receiving lane position information indicating a position of a lane boundary line;
detecting the position of the lane boundary line, the lane boundary line indicating a boundary in a width direction of a road on which an own vehicle travels, based on a captured image captured by a camera configured to capture the captured image around the own vehicle;
receiving position information indicating a position of an other vehicle;
receiving relative speed information of the other vehicle, the relative speed information being based on the position of the other vehicle;
detecting the position of the other vehicle based on the captured image and the position information;
determining whether the other vehicle is approaching the own vehicle based on the relative speed information;
performing a traveling state determination of determining, when the processor determines that the other vehicle is approaching the own vehicle, whether the other vehicle and the own vehicle are traveling in a same lane or the other vehicle and the own vehicle are about to travel in the same lane, based on the lane position information and the position of the other vehicle; and
performing control to output a warning to a driver of the own vehicle based on a relationship between the position of the lane boundary line and the position of the other vehicle,
wherein the warning is output to the driver of the own vehicle at least when the processor determines that the other vehicle and the own vehicle are traveling in the same lane or when the processor determines that the other vehicle and the own vehicle are about to travel in the same lane, and when the processor determines that the other vehicle is approaching the own vehicle.

13. A non-transitory computer-readable storage medium storing a program to execute processing executable by a processor, the program causing the processor to execute:
receiving lane position information indicating a position of a lane boundary line;
detecting the position of the lane boundary line, the lane boundary line indicating a boundary in a width direction of a road on which an own vehicle travels, based on a captured image captured by a camera configured to capture the captured image around the own vehicle;
receiving position information indicating a position of an other vehicle;
receiving relative speed information of the other vehicle, the relative speed information being based on the position of the other vehicle;
detecting the position of the other vehicle based on the captured image and the position information;
determining whether the other vehicle is approaching the own vehicle based on the relative speed information;
performing a traveling state determination of determining, when the processor determines that the other vehicle is approaching the own vehicle, whether the other vehicle and the own vehicle are traveling in a same lane or the other vehicle and the own vehicle are about to travel in the same lane, based on the lane position information and the position of the other vehicle; and
performing control to output a warning to a driver of the own vehicle based on a relationship between the position of the lane boundary line and the position of the other vehicle,
wherein the warning is output to the driver of the own vehicle at least when the processor determines that the other vehicle and the own vehicle are traveling in the same lane or when the processor determines that the other vehicle and the own vehicle are about to travel in the same lane, and when the processor determines that the other vehicle is approaching the own vehicle.

* * * * *